(12) United States Patent
Kitson et al.

(10) Patent No.: US 6,937,135 B2
(45) Date of Patent: Aug. 30, 2005

(54) FACE AND ENVIRONMENT SENSING WATCH

(75) Inventors: Frederick Lee Kitson, Livermore, CA (US); Jason James Brown, San Francisco, CA (US); John Apostolapoulos, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 09/870,188

(22) Filed: May 30, 2001

(65) Prior Publication Data

US 2002/0180586 A1 Dec. 5, 2002

(Under 37 CFR 1.47)

(51) Int. Cl.[7] .................................................. H04Q 1/00
(52) U.S. Cl. ........................................ 340/5.52; 340/5.4
(58) Field of Search ................................ 340/5.4, 5.52, 340/5.53

(56) References Cited

U.S. PATENT DOCUMENTS

| | | | |
|---|---|---|---|
| 4,952,928 A | * 8/1990 | Carroll et al. ........... 340/10.41 |
| 5,572,596 A | 11/1996 | Wildes et al. | |
| 5,578,813 A | 11/1996 | Allen et al. .............. 250/208.1 |
| 5,812,067 A | * 9/1998 | Bergholz et al. ........... 340/5.52 |
| D427,918 S | 7/2000 | Nakai et al. .................. D10/31 |
| D429,468 S | 8/2000 | Nakai et al. ................ D10/215 |
| 6,141,436 A | 10/2000 | Srey et al. | |
| 6,259,805 B1 | * 7/2001 | Freedman et al. .......... 382/124 |
| 6,446,862 B1 | 9/2002 | Mann | |
| 2002/0111994 A1 | * 8/2002 | Raghunandan .............. 709/203 |
| 2004/0044627 A1 | * 3/2004 | Russell et al. ................. 705/50 |

FOREIGN PATENT DOCUMENTS

| | | |
|---|---|---|
| DE | 19938064 | 8/2000 |
| WO | WO98/12670 | 3/1998 |
| WO | WO00/26848 | 4/2000 |

OTHER PUBLICATIONS

Borman et al., Spatial Resolution Enhancement of Low–Resolution Image Sequences A Comprehensive Review with Directions for Future Research, Jul 8, 1998, p. 42.*

Eren, P. Erthan; Sezan, M. Ibahim; and Tekalp, A Murat;, "Robust, Object–based High Resolution Image Rescontruction from Low Resolution Video," IEEE Transactions on Image Processing, vol. 6 No. 10, Oct. 1997.

Bad, Michael, and Feuer,Arie; "Restoration of a Single Superesolution Image from Several Blurred, Noisy,and Undersampled Meaured Images," IEEE Transactions on Image Processing, vol. 6, No. 12, Dec. 1997.

(Continued)

*Primary Examiner*—Brian Zimmerman (57) ABSTRACT

A face and environment sensing portable device. In a preferred embodiment, the device is wrist-worn by a person, similarly to a wristwatch. The portable device includes one or more sensing elements, such as an image-capturing device, a microphone or other environmental sensor, and a processing system for processing data obtained from the sensing element(s). In addition, the portable device may include input/output elements for interfacing the portable device with a person and with external systems. The portable device reliably authenticates the identity of the person based on information obtained from the sensing element(s) and may also determine whether the user has been in continuous possession of the device. By using multi-modal identification, the invention may provide increased confidence, while maintaining a low cost. This verification may then be used, for example, to enable the person to conduct secure transactions.

30 Claims, 5 Drawing Sheets

OTHER PUBLICATIONS

Patti, Andrew J.; Sezan, M Ibrahim; and Tekalp, A. Murat; "Superresolution Video Reconstruction with Arbitrary Sampling Lattices and Nonzero Aperure Time," IEEE Transactions on Image Processing, vol. 6, No. 8, Aug. 1997.

Tekalp, A. Murat, Digital Video Processing, "Chapter 17; Superresolution," Prentice Hall PTR, 1995.

"NBC Today: Watches,"Printed from www.Beststuff.com on Apr. 18, 2001.

International Market News, "Making up for Lost Time," www.tdctrade.com, vol. 16, No. 8, Aug. 2000.

"WQV–2–1 Wrist Camera Watch," "WQV1D–8CR Wrist Watch Camera," "WQV1–1CR– Wrist Camera Watch," Printed from www.casio.com on Apr. 18, 2001.

* cited by examiner

FACE AND ENVIRONMENT SENSING WATCH

FIELD OF THE INVENTION

The present invention relates to the field of portable electronic devices. More particularly, the present invention relates to the field of portable electronic devices for image recognition.

BACKGROUND OF THE INVENTION

Often, it is desired to confirm or authenticate the identity of a person. This may be done, for example, prior to allowing the person to enter a secure area, such as a place of employment, a governmental facility, a mode of transportation or an establishment where alcoholic beverages are served. Another context for confirming identification may be prior to allowing a person to perform certain transactions, such as making a credit purchase, receiving certain goods or receiving confidential information. Numerous other instances occur regularly in modern society in which the identity of a person requires authentication.

Typically, confirmation of the identity of a person is performed manually by someone, such as a clerk, comparing observed physical characteristics of the person to a photographic identification carried by the person. Examples of photographic identification include a driver's license, ID card and passport.

This manual technique has certain drawbacks. For example, it is subject to error. This is because only a short amount of time is typically available for verifying the identification of a person, while the clerk who is verifying the person's identification is often untrained. In addition, the observed physical characteristics are not expected to match the photographic identification exactly. This due to changes, such as aging of the person and changes in hairstyle, hair color and weight, which often occur after the photograph or other information is obtained. Further, photographic identification is subject to tampering, such as by replacement of the photograph with that of another person.

Some automated techniques have been attempted for authenticating identity using biometrics, such as fingerprint, iris or facial image scanning and voice recognition. However, none of these techniques has yet gained widespread acceptance. This is likely due to several factors, such as high costs of equipment to perform these techniques, difficultly in obtaining reference samples for comparison to determine whether there is a match, the need to provide a controlled environment for taking samples, and difficulty achieving a reliable comparison results. Particular examples of problems encountered in optical fingerprint scanning include dirt and oil being present between the sensor and the person's finger, the orientation of the sensor with respect to the person's finger and insufficient sensitivity in the sensor.

Increasingly, transactions are performed remotely, such as through an Internet website or by telephone. Thus, many goods and services that were traditionally provided only through in-person transactions can now be obtained from a distance. This includes, for example, making purchases and conducting financial transactions such as applying for a loan.

Where a transaction is performed remotely, it is not generally possible to verify a person's identity using photographic identification. Accordingly, the identity of a person attempting such a transaction is typically verified by requiring the person to provide information that only the person should know, such as a password, his or her social security number or mother's maiden name. This type of information, however, can be all too easy for unscrupulous persons to obtain and, thus, such persons may be able to conduct unauthorized transactions. The use of passwords has additional drawbacks due to their proliferation. It is often burdensome for a person to keep track of the multitudes of passwords he or she may be issued by banks, retailers, service providers, employers, governmental and quasi-governmental agencies, etc.

Therefore, what is needed is an improved technique for confirming the identification of a person. It is to these ends that the present invention is directed.

SUMMARY OF THE INVENTION

The invention is a face and environment sensing portable device. In a preferred embodiment, the device is wrist-worn by a user, similarly to a wristwatch. The portable device includes one or more sensing elements, such as an image-capturing device, a microphone or other sensor, and a processing system for processing data obtained from the sensing element(s). In addition, the portable device may include input/output elements for interfacing the portable device with a user and with external systems. The portable device reliably authenticates the identity of the person based on information obtained from the sensing element(s) and may also determine whether the user has been in continuous possession of the device. By using multi-modal identification, the invention may provide increased confidence, while maintaining a low cost. This verification may then be used, for example, to enable the user to conduct secure transactions and to gain entry to secure locations. The verification may also be used to tailor or customize applications and services to the user's personal preferences. The invention avoids drawbacks of conventional authentication techniques, such as inaccuracies in manual photographic identification techniques and the proliferation of excessive numbers of passwords.

The image-capturing device may be, for example, a charge-coupled device (CCD) camera. The camera may be used to collect biometric information regarding the user. Thus, the camera may capture one or more images of the wearer, such as of the wearer's face or iris of the wearer's eye. Because the portable device may be wrist worn, the images are expected to be consistent in distance from the wearer and angle with respect to the wearer's face when the image is captured. For example, the images may be taken when the user is viewing a display on the device. This consistency increases accuracy of identification confirmation. The captured images may be used to form a baseline image or profile for comparison purposes. Images may be subsequently compared to the baseline for confirming the identification of the wearer. For example, a series of images may be combined to form a baseline image of the wearer. Then, additional images of the wearer may be captured and compared to the baseline image to ensure that the identity of the wearer has not changed. Over time, the baseline image may be updated with newer images to reflect changes in the appearance of the wearer, such as in the wearer's hairstyle.

When confirmation of identity is required, such as to perform a transaction, the identity of the wearer may be confirmed assuming no changes in identity were detected. The device may provide indicia to confirm the wearer's identity. For, example, the portable device may transmit an encrypted signal to an external system indicating whether the identity of the wearer has been authenticated. As another example, an alphanumeric display on the device may provide the name of the wearer. If the wearer's identity cannot be confirmed, such as where newly captured images do not match the baseline image, alternate indicia may be provided. For example, the display may read, "unknown identity."

The microphone may be used in a similar manner as the image-capturing device. Thus, samples of the wearer's voice may be recorded to form a baseline voice sample. Then, to conform the wearer's identity, new samples may be taken and compared to the baseline voice sample. The device may then provide indicia as to whether the wearer's identity is confirmed.

Further, the identity of the wearer may be confirmed by use of images alone, by voice samples alone or a combination of images and voice samples. By using a combination of images and voice samples to form a baseline profile and for comparison to the baseline profile, confidence that the identity of the user has been correctly identified may be improved. Additional sensors may also be utilized, such as temperature, location, altitude and motion sensors. These sensors may sense environmental factors, including light level, whether the wearer is indoors or outdoors, and geographic position to further increase confidence in the results.

Further, the device may also sense whether it has continuously been in possession of the user. This determination may be based on the biometric data used to authenticate the user's identity. For example, if the device is out the user's possession, this may indicate that the device is misplaced or stolen such that it may fall into the possession of an unauthorized person. In which case, authentication may be disabled.

Additional functionality may be included in the device such as to provide information based on data collected from the sensors. For example, the device may provide useful information to the wearer based on environmental factors. For example, the device may remind the wearer to bring a sweater if the sensed temperature for the time of day indicates chilliness.

The invention may also overcome drawbacks in the abilities of low-cost image sensors by applying superresolution techniques to combine multiple lower quality images into an image with improved quality. Super-resolution processing can be performed in the portable device itself or by an external infrastructure.

Accordingly, the present invention provides improved techniques for confirming the identity of a person and for detecting whether the device has been in continuous possession of the user. Particularly, confidence in these determinations may be improved in comparison to prior techniques by consistency measurements and by environmental factors sensed by the device.

DETAILED DESCRIPTION OF A PREFERRED EMBODIMENT

Figure 1:
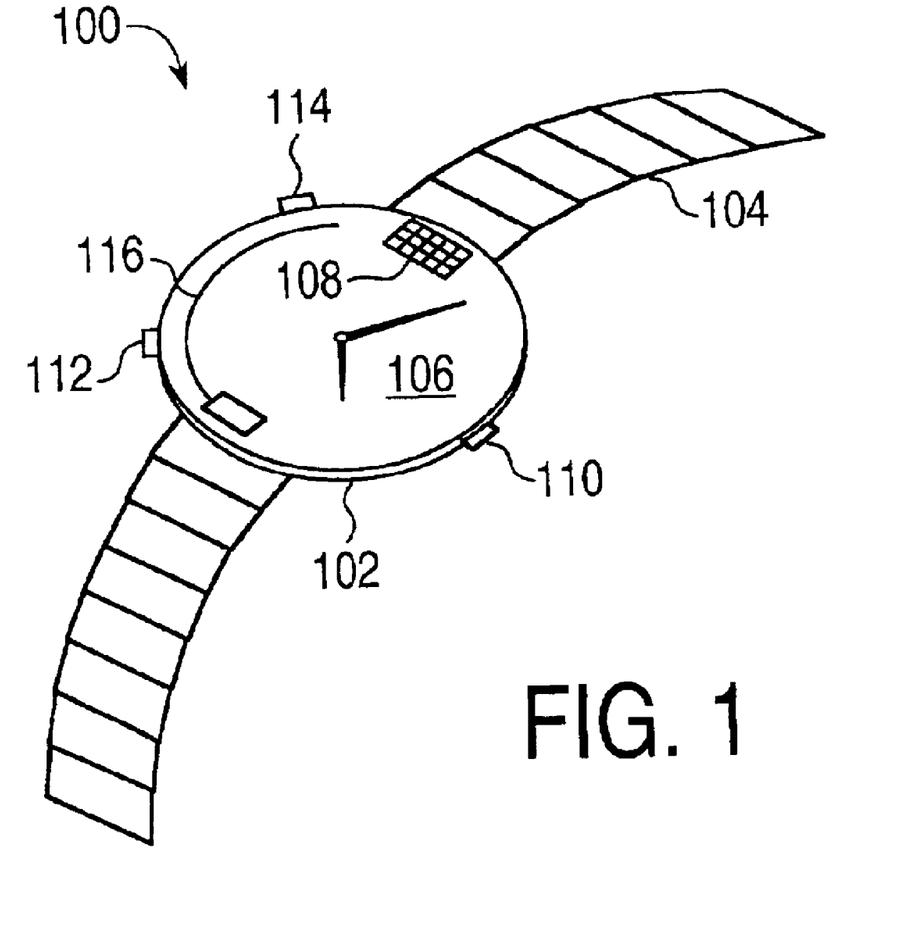
FIG. 1 illustrates a perspective view of a wrist-worn embodiment of the portable device in accordance with the present invention.

FIG. 1 illustrates a perspective view of a wrist-worn embodiment of the portable device 100 in accordance with the present invention. As shown in FIG. 1, the device 100 may include a housing 102 that is coupled to a wristband 104. The housing 102 provides a protective enclosure for internal circuitry 200 (FIG. 2) of the device 100, while the wristband 104 may be used to fasten the device 100 to the arm of a user. The housing 102 is preferably water resistant.

It will be apparent that another means for fastening the portable device 100 to the wearer may be provided. For example, a clip for fastening the device 100 to the wearer's clothing, a lanyard for hanging the device 100 from the wearer's neck, or a ring for fastening the device to the wearer's finger may be provided. Further, while the device 102 is preferably carried by the user, it need not be fastened to the user. For example, the device 102 may be carried in a wallet or purse, fastened to a key chain or may be incorporated into another device normally carried by the user, such as a portable telephone or pager.

Figure 2:
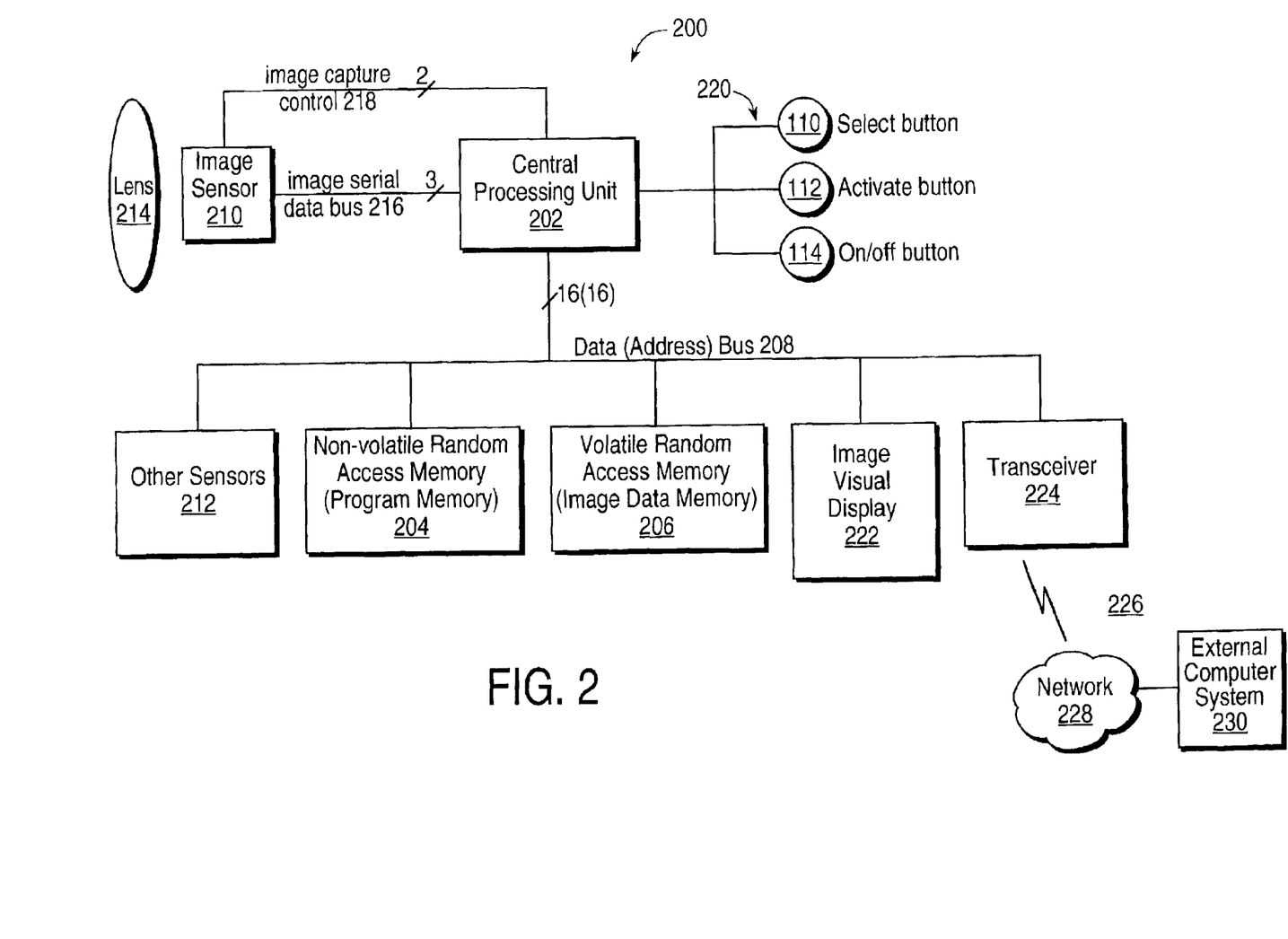
FIG. 2 illustrates a block schematic diagram of circuitry of device of FIG. 1 in accordance with the present invention.

FIG. 1 also illustrates a display area 106 for providing information to the wearer, such as time of day and status information regarding operation of the device 100. Sensing elements, such as element 108, may be positioned in or on the housing 102. For example, the sensing element 108 may include lens of a camera for capturing images by the device 100. In addition, device 100 may include an audio input device, such as a microphone 212 (FIG. 2). An audio output device, such as a speaker, may also be provided. User controls, such as button switches 110, 112 and 114 may be provided on the housing 102 for accepting input from the wearer of the device 100. Also, an antenna 116 may be provided so that the device may send or receive wireless communications.

FIG. 2 illustrates a block schematic diagram of circuitry 200 of the device 100 (FIG. 1) in accordance with the present invention. A general-purpose central processing unit (CPU) 202 may be coupled to memory devices 204 and 206 via a communication bus 208. One or both of the memory devices 204 and 206 may store software programs to be executed by the CPU 202 for controlling operation of the device 100. In addition, one or both of the memory devices 204 and 206 may store information captured by sensors 210 and 212 and processed by the CPU 202. In a preferred embodiment, the memory 204 is non-volatile random access memory (RAM) and stores program information, while the memory 206 is volatile RAM and stores sensed information.

The sensor 210 may include an image sensor, such as a charge-coupled device (CCD) camera. A lens 214 focuses light received onto the sensor 210 that is reflected from an object being imaged. An array of light-sensitive elements, such as a rectangular array of photo-transistors, of the sensor 210 may receive the focused light from the lens 214 and may form analog signals representative of light intensity. Analog-to-digital converters included in the sensor 210 may form an image that includes a digital value for each pixel (e.g., 8 bits per pixel). The image may be processed in the sensor 210, such as by spatial filtering and compressed so that the image occupies less memory space (e.g., 4 bits per pixel). In a preferred embodiment, the sensor 210 includes an integrated circuit (IC) chip available from Hewlett-Packard Company under the name "Pathfinder." However, it will be apparent that another type of image sensor may be used.

The image information obtained by the sensor 210 may be provided to the CPU 202 via a serial data bus 216. A control interface 218 allows the CPU 202 to control operation of the sensor 210. For example, the CPU 202 may instruct the sensor 210 to capture an image at appropriate time via the control interface 218.

Other sensors 212 may collect additional biometric data from the user. For example, a microphone may record voice samples from the user, or a temperature sensor may sense bodily temperature of the wearer of the device 100. The sensors 212 may also sense environmental data. For example, the microphone may sense background noise, while the temperature sensor may sense ambient temperature. Further, a position sensor, such a global positioning system (GPS), may determine the wearer's geographic location.

Input/output devices may also be included. Thus, user controls 220, such as the button switches 110, 112 and 114 (FIG. 1) may be coupled to the CPU 202 for controlling its operation. For example, a "select" button may allow the user to navigate a menu of functions by scrolling through a list of such functions. The functions may include, for example, capturing an image by the image sensor 210, obtaining a reading from one of the other sensors 214, such as ambient temperature or bodily temperature of the wearer, displaying the time of day or a previously obtained image. An "activate" button 112 may activate a certain function selected by the "select" button 110. For example, the user may press the "activate" button to instruct the image sensor 210 to obtain an image. An "on/off" button 110 may disable certain functions of the device 100, such as to conserve battery power when not needed. The button switches 110, 112 and 114 may be coupled to an interrupt input of the CPU 202.

A visual image display 222 coupled to the communication bus 208 may display information, such as on the display area 106 of FIG. 1. For example, in response to the user manipulating the controls 220, the display 222 may provide a visual indication of the time of day; an image obtained by the image sensor 210; status information regarding operation of the device 100; or results of performing authentication processing. For example, the display 22 may indicate which function will be activated if the user presses the "activate" button 112. As another example, the display 222 may indicate whether the identification of the wearer is confirmed.

A transceiver 224 may be provided for communications between the device 100 and an external infrastructure 226. For example, the infrastructure 226 may include a communication network 228 and external systems, such as a computer 230. The network 228 may also provide access from the device 100 to the world wide web such as to allow the user to perform transactions via the Internet. The transceiver 224 may be coupled to the antenna 116 for wireless communications and may provide a wired interface to the network 228.

As mentioned, the device 100 may be used to authenticate the identity of a person based on images obtained by the sensor 210. An important aspect for algorithms for iris or face recognition and authentication is that the images of the iris or face be acquired with high spatial resolution (e.g., 256×256 pixels) and good amplitude resolution (e.g. 8 bits/gray-scale pixel, 24 bits/color-pixel). Generally, the higher the spatial resolution, the better the performance that can be achieved with conventional recognition algorithms.

Conventional watches with built-in cameras typically have very low spatial resolution of the camera sensor and hence the acquired image. For example, it is believed that the WQVI-ICR Wrist Camera Watch available from Casio, Inc. has a spatial resolution of 120×120 pixels and amplitude resolution of the captured image of 4 bits per pixel (16 grayscales). This limited spatial resolution and amplitude resolution would make such a built-in camera unsuitable for iris or face recognition algorithms contemplated by the present invention. This is particularly apparent when one realizes that an image of a person's face typically only occupies a small portion of the image sensor and the iris may occupy an even smaller portion.

One option is to provide a higher quality sensor 210 having a higher resolution. However, these higher quality sensors tend to be more expensive and require more power than other sensors, which may result in a more expensive device 100 that has less battery life.

To overcome this problem, the device 100 preferably uses the camera sensor 210 to capture a number of consecutive images of the face or eye of the wearer, and combines these images together using a superresolution algorithm to generate a single higher quality image than can be produced by a single image frame capture by the camera 210. These superresolution images may have a higher spatial resolution, improved amplitude resolution (e.g. 8 bits/pixel instead of 4 bits/pixel), and reduced noise (e.g. by canceling additive noise from the sensor) as compared to that of a single image. The improved characteristics in this superresolution image can lead to significantly better recognition performance. For example, the probability of an accurate recognition decision is expected to increase and the probability of an inaccurate recognition decision is expected to decrease.

A number of superresolution algorithms are known, and the device 100 may apply any of them. For example, such an algorithm may be stored in memory 204 as a software program that is executed by the CPU 202. Examples of these algorithms are described in the literature: "Superresolution," Chapter 17, *Digital Video Processing*, A. M. Tekalp, Prentice Hall, 1995; A. J. Patti, M. I, Sezan, A. M. Tekalp, "Superresolution Video Reconstruction with Arbitrary Sampling Lattices and Nonzero Aperture Time," IEEE Transactions on Image Processing, No.8, August 1997, pp. 1064–1076; P. E. Eren, M. I. Sezan, A. M. Tekalp, "Robust, Object Based High Resolution Image Reconstruction from Low Resolution Video," IEEE Transactions on Image Processing, No. 10, October 1997, pp. 1446–1451; and M. Elad, A. Feuer, "Restoration of a Single Superresolution Image from Several Blurred, Noisy, and Undersampled Measured Images," IEEE Transactions on Image Processing, No. 12, December 1997, pp. 1646–1658.

Figure 4:
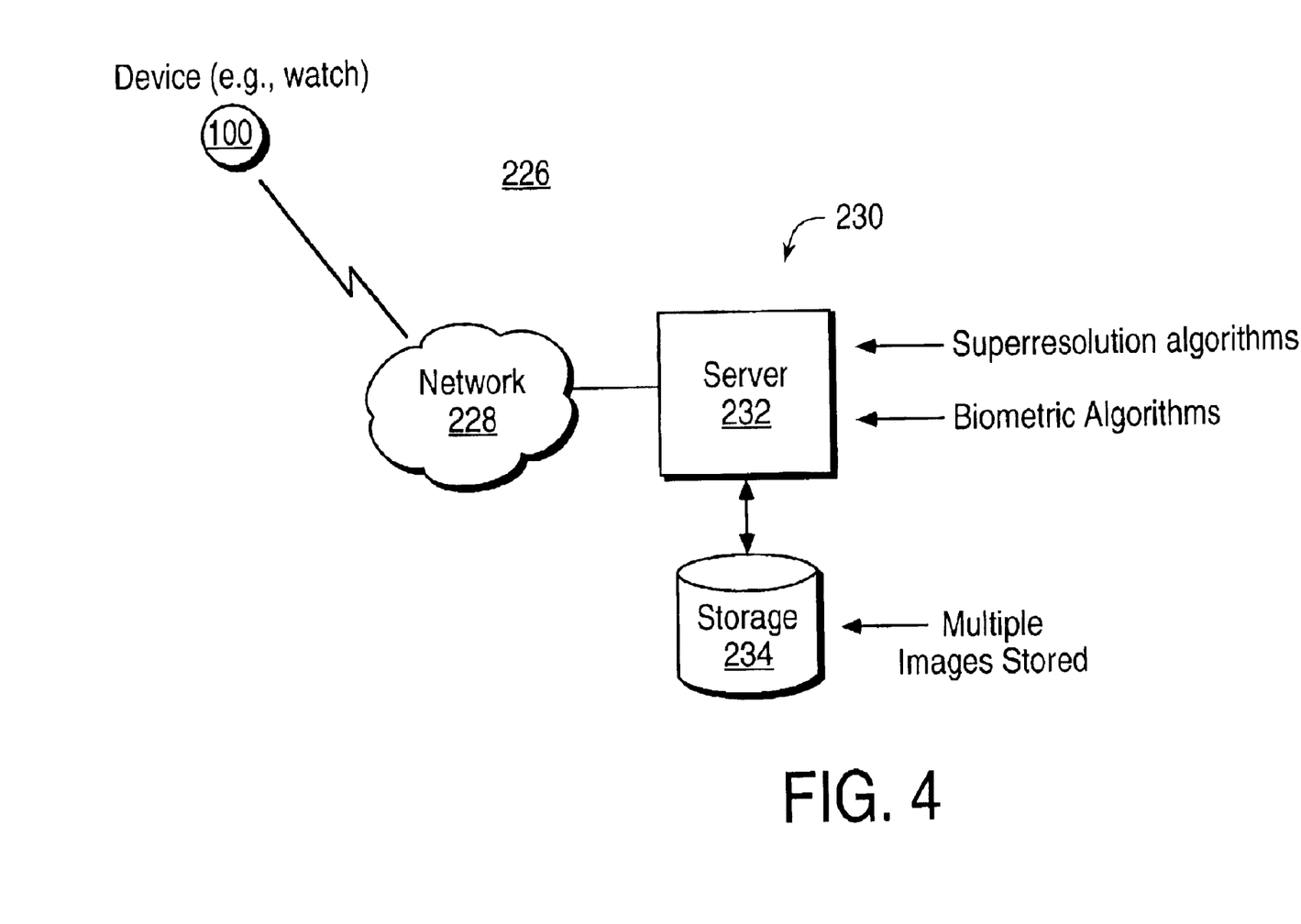
FIG. 4 illustrates a more detailed block schematic diagram of the external infrastructure of FIG. 2.

The image processing and recognition algorithms, such as a superresolution algorithm, may be performed in the device 100, itself, such as by the CPU 202. However, such processing may be performed in the external infrastructure 226. FIG. 4 illustrates a more detailed block schematic diagram of the external infrastructure 226 illustrated in FIG. 2. As shown in FIG. 4, the computer system 230 may include a server 232 coupled to the network 228 and a mass storage device 234 coupled to the server 232. The server 232 may perform superresolution algorithms for improving the effective image resolution and may also perform biometric algorithms for authentication. For example, the superresolution algorithms and biometric algorithms may be stored as software programs that control operation of the server 232.

In this aspect of the invention, the device 100 (FIG. 1) captures multiple images of the person, or important features in the images. The device 100 may then communicate these images to the infrastructure 226. For example, the images captured by the device 100 (FIG. 1) may be transmitted via the wireless transceiver 224 (FIG. 2) to the network 228 and then to the external computer system 230 where the images may be stored in storage device 234 and processed by server 232. The wireless communication protocol may be, for example, Bluetooth, IEEE 802.11, 2-G, 3-G, or 4-G cellular. Alternately, a wired connection may be made to the server 232.

The superresolution algorithms and/or biometric algorithms may then be applied in the infrastructure 226 rather than in the device 100. For example, the server 232 of computer system 230 may then perform the superresolution algorithm on the received images to compute a higher quality image from the multiple images that were captured. The resulting higher quality image may then be used to verify identity by applying biometric image recognition algorithms to the image. In addition, the biometric algorithms may use other data, such as prior captured images stored in the infrastructure 226 to aid in authentication. The external computer system 230 may then return the results of such processes to the device 100 via the network 228 and transceiver 224.

Performing the superresolution and recognition processing in the infrastructure 226 (as opposed to in the device 100) provides a number of benefits, including reduced processing and memory capacity required within the device 100, since more such capacity may be provided by the infrastructure 226. For example, server 232 may have a processor that is significantly more powerful than the CPU 202 (FIG. 2) of the device 100. In addition, more sophisticated and higher performance superresolution algorithms and biometric algorithms be applied. In addition, the storage capacity of the computer system 230 may include mass storage 234, which may store many images (and other biometric data) of the user taken over an extended period of time.

This off-loading of processing and storage to the infrastructure 226 is expected to reduce the cost of the device 100. In addition, more sophisticated and higher accuracy algorithms may be performed in the infrastructure 226 than in the device 100, leading to higher accuracy. This is because the device 100 has a limited size and, thus, limited processing capability and storage capacity in comparison to the computer system 230. Further, as improved algorithms are developed or otherwise become available, these algorithms may be incorporated to provide improved service to the user. The algorithms stored in the infrastructure 226 may be upgraded more easily than algorithms in the device 100, such as by loading the improved algorithms into the computer system 230 via the network 228. This avoids the need to replace or upgrade the device 100 itself.

In addition, centralized control over decisions and functionality of the device 100 may also be provided by the infrastructure 226. For example, if it is known that the device 100 has been stolen, the infrastructure 226 can disable the device 100 or at least ensure that any recognition decisions or transaction attempts are not confirmed. In addition, the infrastructure 226 may notify the proper authorities if someone makes a false attempt to be recognized as another person. A service provider can provide the identification confirmation, image recognition, or other processing or assistance, as services via the infrastructure 226. As such, access to the services can be limited to paying customers of the service provider. For example, the user or businesses with which the user conducts a transaction may pay a fee on a per-recognition basis or on a periodic basis, as opposed to paying just once when a user purchases the device 100.

Functionality may be included in the device 100 that is in addition to its identity authentication functions. For example, the device 100 may provide useful information based on data collected from the sensors, such as data related to environmental conditions. For example, the device may remind the wearer to bring a sweater if the sensed temperature for the time of day indicates chilliness. Alternately, the device 100 may advise the wearer of a possible medical condition when the sensed bodily temperature is elevated.

Figure 3:
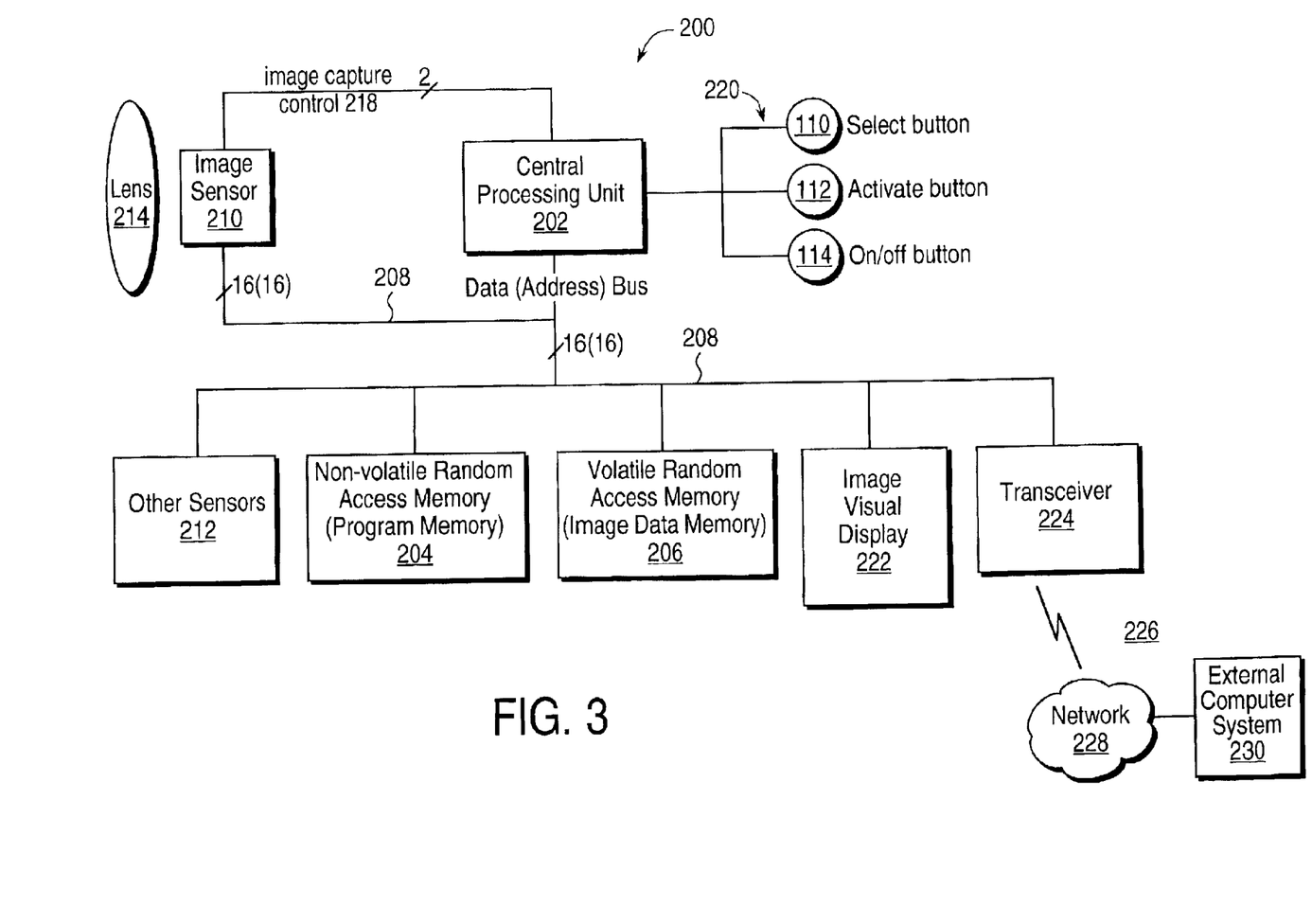
FIG. 3 illustrates an alternate embodiment of the circuitry of the device of FIG. 1 in accordance with the present invention.

FIG. 3 illustrates an alternate embodiment of the circuitry 200' of the device 100 of FIG. 1 in accordance with the present invention. Elements of FIG. 3 that have a one-to-one functional correspondence with elements of FIG. 2 are given the same reference numeral. FIG. 3 differs from FIG. 2 primarily in that the separate serial bus 216 of FIG. 3 is omitted and, instead, the communication bus 208 also serves to provide captured images to the CPU 202. The embodiment of FIG. 3 provides an advantage in that the separate bus 216 of FIG. 2 is not required. In addition, captured image data may be provided directly via the bus 208 to elements of the device 100, such as the memory 206 or the display 222. However, the embodiment of FIG. 3 requires that the image sensor 210 have capability to interface directly to the communication bus 208, which may be a systems standard bus, such as peripheral component interconnect (PCI).

Figure 5:
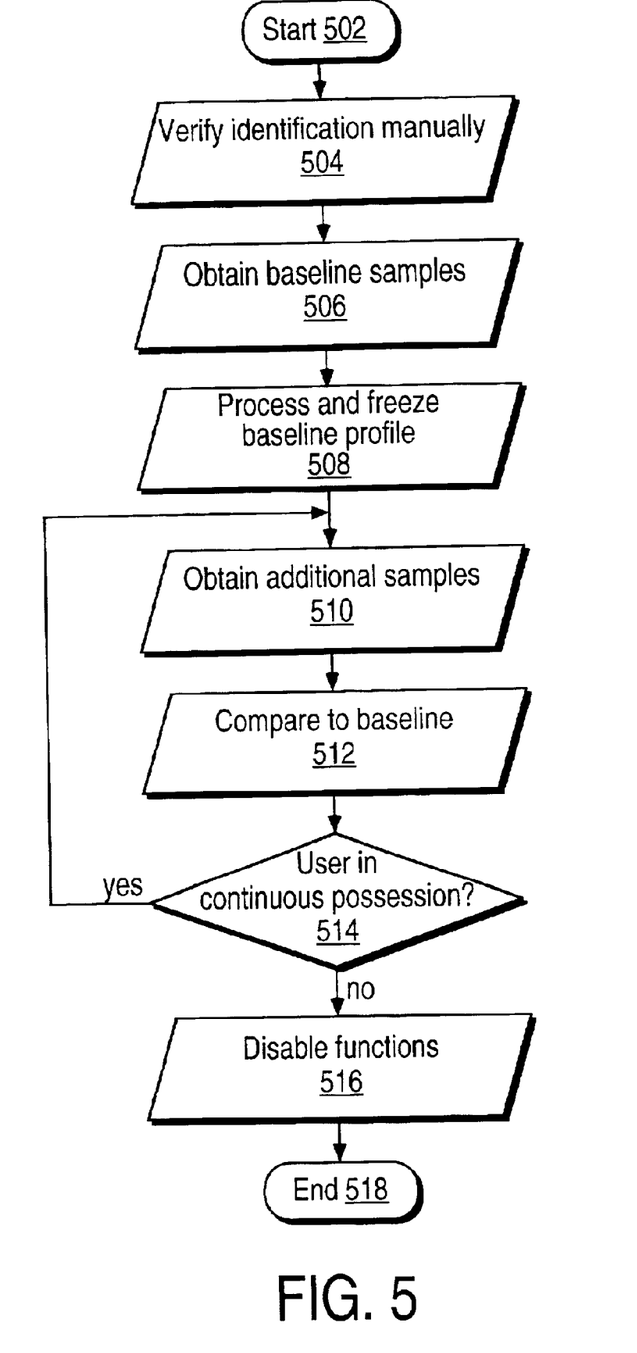
FIG. 5 illustrates a flow diagram for operation of the device of FIGS. 1–3.

FIG. 5 illustrates a flow diagram 500 for operation of the device of FIGS. 1–3. Program flow begins in a start state 502. From the state 502, program flow moves to a state 504. It is generally necessary to ensure that the device 100 forms a baseline profile of the correct person. Thus, in the state 504, the identification of the user may be verified manually. For example, a photographic identification may be consulted and/or the user may be required to provide information that only he or she should know, such as his or her social security number or mother's maiden name.

Next, program flow moves to a state 506. In the state 506, baseline biometric data may be captured from the sensors 210 and/or 212. For example, the user may attach the device 100 (FIG. 1) to his or her wrist and one or more images of the wearer may be captured.

Images of the wearer may be captured while the user is viewing the display of the device 100. Where functions of a wristwatch, such as display of the time or date are incorporated into the device 100, the wearer may be required to press one of the buttons 220 (FIG. 2) on the device 100 to display the time or date. When the button is pressed, it is expected that the wearer will have his or her face positioned in front of the device 100 in order to observe the displayed time or date. Accordingly, an image of the wearer may be captured when the button is pressed. It is expected that images taken in this manner will exhibit consistency in the orientation of the device 100 with respect to the wearer. For example, the device 100 will likely be held at a consistent distance from the wearer's face and at a consistent angle with respect to the wearer's face when the images are captured. This will increase the confidence in the results in authenticating the user's identity without the user having to take special steps or even be aware that the user is having his or her image captured. These images may be used to identity the wearer based on facial biometrics and/or by biometrics of the wearer's iris.

Also in the state 506, other types of biometric information may be obtained from the user. For example, baseline voice samples may be obtained from the wearer. In which case, the wearer may be required to speak his or her name or a predetermined phrase several times into a microphone included in the sensors 212 (FIG. 2). As another example, a fingerprint may be obtained from the user, such as by placing the user's finger over the image sensor 210.

Accordingly, the identity of the wearer may be confirmed by use of images alone, by voice samples alone or a combination of images and voice samples. This use of multiple recognition criteria may be referred to as "multimodal" recognition. By using a combination of images and voice samples to form a baseline profile and for comparison to the baseline profile, confidence that the identity of the user has been correctly identified may be improved. These sensors may also sense environmental factors, including light level, whether the wearer is indoors or outdoors, and geographic position to further increase confidence in the results. For example, the fact that the person is indoors may affect level or type of background noise present in the voice samples. This fact can be used to adjust algorithms used for voice recognition.

From the state 506, program flow moves to a state 508. In the state 508, the baseline image and/or voice samples obtained in the state 506 may be processed into the baseline profile of the user. This may include applying a known superresolution algorithm to the image samples and applying a known voice recognition algorithm to the voice samples. Further, the profile may include image information and voice information. The samples taken for forming the baseline may also include other information; for example, environmental information such as geographic location may be recorded, to provide additional reference data for incorporation into the baseline profile. Processing the sensed data into the baseline profile may be performed by the device 100 itself or by the infrastructure 226.

Accordingly, the device is initialized in the states 504, 506, 508 and calibrated to a particular user. The manual verification of the identity of the user may be performed in the state 504 at a place of purchase of the device 100 or other centralized location. Because this manual verification need be performed infrequently, increased caution may be used to ensure that the identity of the user is correctly verified before the image and voice samples are taken in the states 504, 506, 508.

In accordance with an alternate technique for calibration of the device 100, image and voice samples may be taken over an extended period of time during which the user goes about his or her normal activities. For example, image samples may be taken when the wearer uses the device 100 to display time of day. In addition, voice samples may be taken during the normal course of the wearer speaking to others. For example, the user may speak his or her name when answering the telephone or making introductions to others. Environmental factors may also be recorded, such as geographic location, ambient temperature or time of day.

All of these samples obtained over an extended period may then be used to form the baseline profile. After a predetermined period time, such as one day or one week, the baseline may be "frozen." Alternately, the user may enter a predetermined code into the device 100 to freeze the profile. Or, the user may return the device 100 to a place of purchase or other centralized location where the user's identity is manually confirmed before the baseline profile can be frozen. Further, the baseline may be frozen remotely by the device 100 receiving an appropriate instruction via the transceiver 224.

Note, however, that the baseline profile need not be permanently frozen. Thus, in one embodiment, the baseline profile may be continuously updated by the device 100 automatically incorporating new images and other sampled data into the baseline profile so long as no significant differences are encountered which would indicate a change in the identity of the person wearing the device. For example, when new images result in confirmation of the wearer's identity those new images may be incorporated into the baseline profile. As such, the baseline profile may tend to evolve over time to help maintain its accuracy. Alternately, the calibration steps 504, 506, 508 may be repeated on a periodic basis, for example once per year, to maintain accuracy of the baseline profile.

Once the baseline profile is obtained in the states 504, 506, 508, program flow moves to a state 510. In the state 510 a program loop may begin in which the device 100 repeatedly attempts to authenticate the wearer's identity. Thus, in the state 510, the device 100 may obtain additional biometric and/or environmental samples of the type obtained in the state 506 to form the baseline sample. For example, several new images of the user's iris or face may be obtained each day at times when the user views the display 222, such as to read the time of day or date. Alternately, the device 100 may prompt the user to take an action that allows the device to collect certain information (e.g., the device 100 may provide an audible prompt for the user to look at the display 222 and press one of the buttons 220 to capture an image of the user). This prompting may occur at predetermined times, random times and/or in response to the user attempting to conduct a secure transaction or attempting to gain access to a secure area.

Then, in the state 512, an image or voice recognition algorithm may be performed by the CPU 202 to compare the data newly obtained in the state 510 to the baseline sample. Additional sensed information such as temperature, location, altitude and motion, may also be utilized to aid in authenticating the wearer's identity. As an example, a temperature sensor may sense the wearer's body temperature and compare it to an expected level to determine whether the user is no longer wearing the device. Also, a motion sensor included in the device 100 may determine that the user is no longer wearing the device 100. Or, a microphone included in the device 100 may sense bio-noise, such as heartbeat or breathing to determine whether the user is wearing the device. As another example, the sensors 212 (FIG. 2) may sense electrical skin activity. If the device 100 is not being worn, the device 100 may disable its authentication functionality and, thus, may prevent any secure transactions from occurring. As a further example, changes in geographic location of the user may indicate a security problem. Thus, if the user's identity is confirmed in Palo Alto, Calif. and then, one hour later, the person attempts an in-person transaction in Florida, the transaction may be disallowed.

As mentioned, authentication of the identity of the wearer may be performed within the device 100 itself. For example, the processor 102 may receive captured biometric information such as image data, sound samples and environmental factors to determine a level of confidence that the wearer is, in fact, the identified person. The level of confidence may then be compared to a predetermined minimum threshold level required for a particular transaction.

The device 100 may also include a transceiver 224 (FIG. 2), such as for wireless communication. For example, the transceiver may communicate sensed information, such as image data of the wearer's face or iris, voice samples, environmental information and the baseline profile to a data processing system (e.g., system 230 of FIG. 2) that is located externally to the device 100. The external system may then perform the required data processing functions. Results of the data processing may then be returned to the device 100 or may be used directly by the external system, such as to initiate a secure transaction with the wearer.

In the state 514, a determination may be made as to whether the comparison indicates a match. Whether the user is in continuous possession of the device 100 may also be determined. If the comparison indicates a match, this means the wearer's identity is confirmed. Accordingly, program flow may return to the state 510. This process of obtaining new biometric samples and comparing them to the baseline profile of the user may continue so long as the wearer's identity can be confirmed in the state 514.

During this period, the user may conduct transactions that require authentication of the user's identity. When confirmation of identity is required, such as to perform a transaction, the identity of the wearer may be confirmed assuming no recent changes in identity were detected. The device may provide indicia to confirm the wearer's identity. For example, the transceiver 224 may communicate a signal or code to enable the transaction. Thus, the portable device 100 may transmit an encrypted signal to an external system indicating whether the identity of the wearer has been authenticated. This encryption may be implemented with a public key and a private key stored in the device 100 and/or the external system. As another example, an indication of the user's identity, such as the name of the wearer, may be displayed by the display 222 of the device 100.

Assuming, however, that the determination made in the state 514 indicates that the user's identity cannot be confirmed or that the user has not been in continuous possession of the device 100, such as where newly captured images do not match the baseline image, then program flow may move from the state 514 to a state 516. In response to this condition, the device 100 may disable certain of its functions. Particularly, the device 100 may disallow certain transactions that require the authentication of the user's identity. Further, if the wearer's identity cannot be confirmed, alternate indicia may be provided. For example, the display may read, "unknown identity." From the state 518, program flow may terminate in an end state 518.

In order to be used again for authentication after entering the state 516, the device 100 may need to be reset. In one embodiment, this would require that the device 100 be returned to a central location or place of purchase. In another embodiment, the device 100 may be reset remotely via the transceiver 224. For example, if the state 516 was entered erroneously, the user may be able to telephone a central location from which the device 100 may be reset remotely by sending an appropriate instruction to the transceiver 224.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for authenticating the identity of a person comprising:

obtaining baseline samples of biometric data from the person;

forming a baseline profile from the biometric data;

repeatedly obtaining additional biometric data from the person in response to the person accessing a portable device for information comprising time of day;

comparing the additional data to the baseline profile for authenticating identity of the person; and developing a response to said comparing.

2. The method according to claim 1, wherein said accessing comprises the person pressing a button on the portable device.

3. The method according to claim 1, wherein said portable device is wrist-worn.

4. The method according to claim 1, wherein said obtaining baseline samples comprises obtaining an image of the person's face.

5. The method according to claim 4, wherein said obtaining baseline samples comprises obtaining an image of the person's iris.

6. The method according to claim 1, wherein said obtaining baseline samples comprising obtaining a fingerprint image of the person.

7. The method according to claim 1, further comprising performing a supperresolution algorithm on the baseline samples.

8. The method according to claim 7, further comprising communicating the baseline samples from the portable device to an external computer system, wherein said performing the supperresolution algorithm is performed in the external computer system.

9. The method according to claim 8, wherein the external computer system performs said comparing the additional data to the baseline samples.

10. The method according to claim 8, further comprising upgrading a superresolution algorithm stored in the external computer.

11. The method according to claim 1, said comparing being by the portable device.

12. The method according to claim 1, said comparing being by a computer system that is external to the portable device.

13. The method according to claim 12, wherein the external computer system includes mass storage for storing the additional biometric data.

14. The method according to claim 1, wherein the response disallows a transaction attempted by the wearer.

15. The method according to claim 14, said comparing comprising:

forming a level of confidence that the identity of the person is correct; and comparing the level of confidence to predetermined minimum threshold level.

16. The method according to claim 15, said predetermined minimum threshold being for a particular transaction attempted by the person.

17. The method according to claim 14, further comprising sensing that the device is not being worn by the person and developing the response when the device is not being worn by the person.

18. The method according to claim 17, said sensing that the device is not being worn by the person comprising sensing a body temperature of the person.

19. The method according to claim 18, said sensing that the device is not being worn by the person comprising sensing a bio-noise of the person.

20. The method according to claim 1, further comprising:

sensing environmental information; and including the environmental information in the baseline profile.

21. The method according to claim 20, wherein said environmental information comprises geographic location.

22. The method according to claim 1, further comprising updating the baseline sample by the additional biometric data when the additional biometric data successfully authenticates the identity of the person.

23. An apparatus for authenticating the identity of a person, comprising:
- a portable display for providing information to a user of the apparatus, the information comprising time of day;
- means for repeatedly obtaining an image of the user in response to the user accessing the apparatus for the time of day information; and
- a memory for storing a baseline profile of the user, wherein the images are compared to the baseline profile for authenticating the identity of the person.

24. The apparatus according to claim 23, wherein the user is required to press a button on the apparatus to receive the time of day information.

25. The apparatus according to claim 23, wherein said portable display is wrist-worn.

26. The apparatus according to claim 23, further comprising means for updating the baseline profile by additional biometric data when the identity of the user is successfully authenticated.

27. The apparatus according to claim 23, wherein the comparison forms a level of confidence that the identity of the user is correct and the level of confidence is compared to predetermined minimum threshold level.

28. The apparatus according to claim 27, said predetermined minimum threshold being for a particular transaction attempted by the user.

29. The apparatus according to claim 23, the device not being worn by the user is sensed and a response developed when the device is not being worn by the user.

30. The apparatus according to claim 23, wherein environmental information is included in the baseline profile.

* * * * *